April 12, 1955     R. A. BRIGHT     2,706,122
LUGGED PIPE JOINT
Filed Sept. 29, 1950

INVENTOR.
Roy A. Bright
BY
Bean, Brooks, Buckley & Bean.
ATTORNEYS

United States Patent Office 2,706,122
Patented Apr. 12, 1955

2,706,122

LUGGED PIPE JOINT

Roy A. Bright, Tonawanda, N. Y., assignor to Du Bois Plastics Products, Inc., Buffalo, N. Y.

Application September 29, 1950, Serial No. 187,423

3 Claims. (Cl. 285—175)

This invention relates to a detachable connection device and to a method of manufacturing the same.

One object of the invention is to provide an improved detachable connection device which will be simple in construction and operation, yet one which will be positive and reliable in use.

Another object of the invention is to provide a simple, yet positive holding detachable connection device which is adapted to be manufactured from plastic material by an inexpensive molding process.

Still another object of the invention is to provide an improved detachable connection combining qualities heretofore found separately in threaded and bayonet type connections.

A further object of the invention is to provide a method of manufacture of an improved detachable connection as aforesaid.

Figure 1:
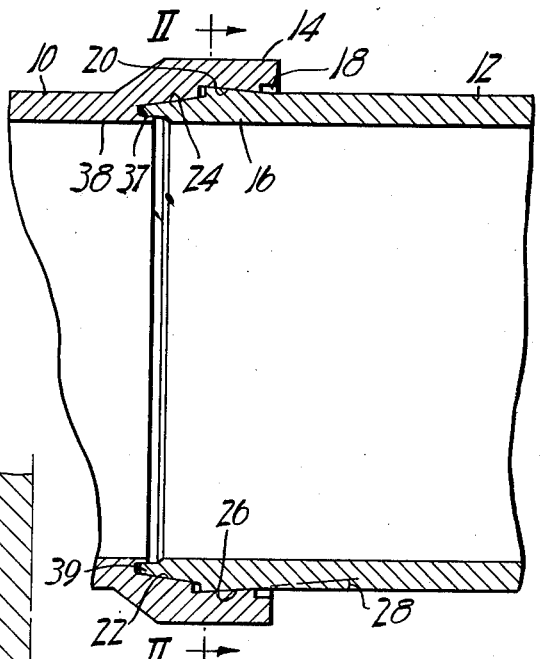
Fig. 1 is a fragmentary longitudinal section view of a pair of tubular elements joined by a detachable connection in accordance with the invention.

Referring more particularly to Fig. 1, one embodiment of the invention is shown applied as to a pair of conduit sections 10, 12 as the means for connecting them together to form a continuous duct. The connection means of the invention, as illustrated in the figure, includes a female portion or collar 14 at the end of one conduit section 10 and a male or nipple portion 16 at the end of the other conduit section 12 which is adapted to be inserted within the collar 14 and secured to the inner surface thereof as will be more fully described hereinafter. The collar portion 14 is formed with a cylindrical aperture 18 large enough to freely receive the overall diameter of the nipple portion 16 of the companion member, and is further formed with an internal annular cam thread or lug portion 20 and a seal portion 22. The nipple portion 16 of the male ended conduit section 12 is exteriorly formed with a seal surface 24 and a cam thread or lug portion 26 of such size and shape as to complement the corresponding surfaces of the female member 14.

Figure 2:
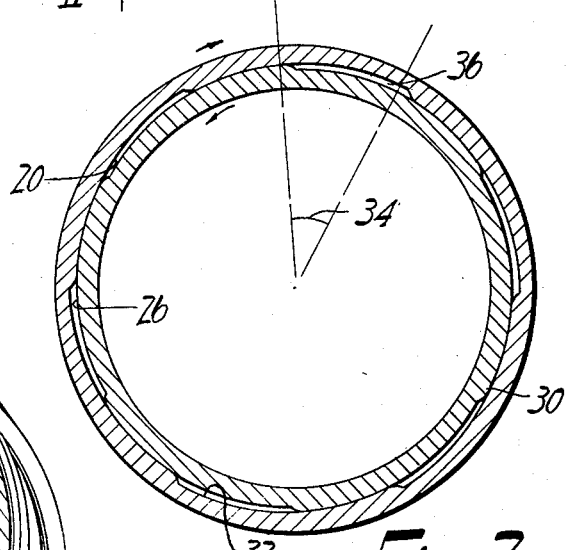
Fig. 2 is a transverse sectional view taken at II—II of Fig. 1.
Figure 3:
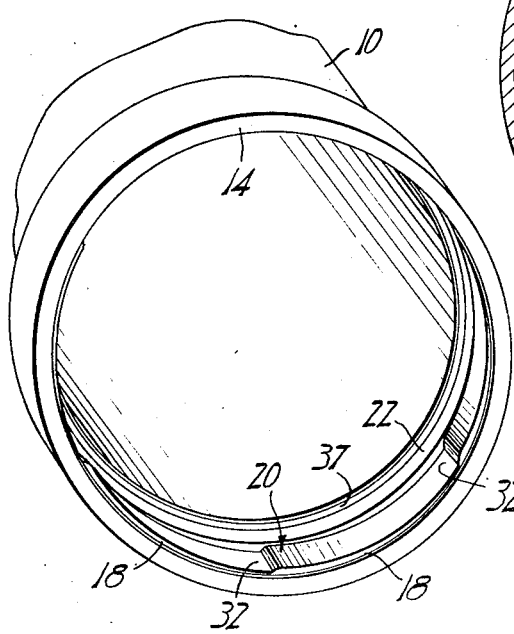
Fig. 3 is a perspective view of the female connector member of Fig. 1.

Referring to Figs. 1 and 2, it will be seen that the cam thread surfaces 20, 26 of the interconnecting members are formed with a back draft as indicated at 28 and are shaped as the nearly identical reverse of each other, the arc described by a cam section being in each case the same. However, the mean trough and crest radii of the female cam portion exceed the mean crest and trough radii, respectively, of the male cam portion by an amount equal to the radial profile of the backdraft plus a suitable clearance, while the mean crest radius of the male cam portion exceeds the mean crest radius of the female cam portion. Thus, the nipple portion 16 can be inserted quite freely into the collar portion 14 of the companion conduit despite the back draft 28 when the cam surfaces 20, 26, are relatively disposed so that the crest portions 30 of the male cam surface 26 fit into the trough portions 32 of the female cam surface 20. Then the slope of the cam elements is such that if one of the conduit sections 10, 12 is rotated clockwise through the angle indicated at 34 with respect to the other conduit section, preferably with accompanying inward axial pressure, the corresponding cam surfaces 20, 26 will tightly engage each other whereby the connection will be frictionally locked against relative rotary motion in either direction. It is a primary feature of the invention that since the cam surfaces 20, 26 are formed with a backdraft they interlock in a screwthread-like fashion as they engage each other so as to urge the conduit sections 10, 12 together and to positively prevent axial detachment thereof.

It will be observed in Fig. 2 that when the connection device is in locked position the cam surfaces 20, 26 necessarily leave open passages 36 therebetween in the areas which have been traversed by the crests 30 of the cam members during the turning of the connection tightening operation, and if it is desired that the connection be fluid tight it is preferable to have a sealing means in addition to the cam thread fastening means. Such a sealing provision is formed in the female member at 22 and consists of a tapered bore ending in a groove portion 37 interposed between the cam thread portion 20 and the interior bore 38 of the conduit section 10. A complementing exteriorly tapered leading edge portion 24 ending in a reduced tongue portion 39 is provided at the end of the nipple 16 of the conduit section 12 beyond the male cam thread section 26. The maximum and minimum diameters of the male sealing surface 24 are respectively slightly larger than the maximum and minimum diameters of the female sealing surface 22 so that the male surface seats tightly within the female surface with the tongue 39 engaging the groove 37 to provide a fluid retentive joint. This tongue and groove combination provides an especially tightly wedged portion of the seal which remains fluid tight despite any tendency of the collar portion 14 to stretch under the radial forces exerted at the engaged cam surfaces 20, 26. It will be understood that the slope of the backdraft of the cooperating cam surfaces 20, 26, as indicated at 28 is such as to seat and retain the male sealing surface 24 in nesting relation with the female surface 22.

Figure 4:
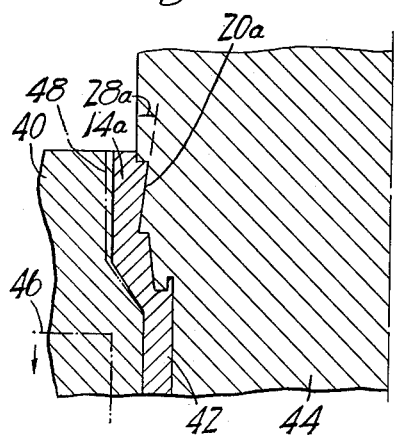
Fig. 4 is a fragmentary sectional view showing a method of manufacture of an element section formed with a connection end in accordance with the invention.

The backdraft 28 of the cam thread portions 20, 26 need not be very large; a one half degree backdraft having been found to be fully satisfactory in service. Thus, given a slightly resilient material, it is possible to manufacture the coupling of the invention by a simple molding process. Such a process is illustrated in Fig. 4, wherein the manufacture of a product piece terminating in a female connection end is depicted. In the figure, a mold member 40 is shown to be shaped to the exterior dimensions of the collar portion 14a of the product piece 42, and another mold member 44 is shaped to form the interior surfaces including the cam thread surface 20a of the female connection portions. For purposes of clarity, the backdraft 28a of the cam surface 20a is shown greatly exaggerated, and it will be understood that this backdraft should not be so great as to prevent removal of the product piece from the mold as hereinafter described.

With the mold members 40, 44, in the positions shown in full line, a suitable plastic molding operation may be carried out whereby a plastic product piece 42 having the illustrated female connection surfaces at one end is formed and fully set up from a suitably tough and slightly resilient plastic such as polystyrene. After the plastic is set, the exterior mold member 40 may be withdrawn in the direction shown in phantom at 46, leaving the molded product piece 42 on the interior mold member 44, from which it may then be stripped. It will be observed that in order to accomplish this, the cam thread surface 20a formed in the end of the product piece 42 must be distended to slide downwardly past the corresponding backdraft forming surface of the internal mold 44. This is possible because the exterior mold member 40 has been withdrawn, thereby permitting the slightly resilient polystyrene plastic to be momentarily stretched and distended outwardly as shown in phantom line at 48 as the backdrafts of the product piece 42 and interior mold 44 slide over each other.

It will be readily understood that a male connection end may be similarly formed by withdrawing the interior mold member first and then removing the product piece, with its exterior cam thread portions, from the exterior mold member. In such case the plastic product piece will be free to be compressed so that the interlocking backdrafts of the product piece and of the mold can slide over each other.

The detachable connection device of the invention combines the quick connecting qualities of a bayonet type connection with the progressive tightening quality of a screw type connection, together with a wedging action which prevents undesired loosening counter-rotation of the parts once they have been joined together. An additional advantage of the cam-threaded device of the invention is that it lends itself to simple molding processes as hereinabove described whereby it can be economically mass produced. Thus, the fact that the backdraft need not be large means that simple resilience in the product piece, or even in the mold itself is sufficient to permit ready withdrawal of the product from the mold.

While the connection device specifically illustrated and described hereinabove is shown as applied to a conduit, it will be readily understood that it lends itself equally well to many different connection applications, such as for example the connection between a jar and its lid, between a camera and an external detachable filter, or even between a bolt and a nut. In this connection it should be noted that the male member need not be hollow unless such a shape would be desirable for facilitating the afore described momentary compression during withdrawal from the mold, depending on the material used. Given a material sufficiently elastic, such as rubber, it would in some cases even be possible to withdraw the product piece without disassembling the mold, the back drafted cam thread portions simply being compressed as they pass over the corresponding mold surfaces. Thus, it will be appreciated that while polystyrene is highly satisfactory in the embodiment illustrated, other resilient moldable materials could be successfully used with the manufacturing process disclosed, or if desired the coupling of the invention could be machined or otherwise formed from non-resilient material.

I claim:

1. A detachable connection comprising a male portion having a plurality of radially inclined male cam elements disposed about the external periphery thereof, each said male cam element being aligned in a plane substantially perpendicular to the longitudinal axis of said male portion, a female portion having corresponding radially inclined female cam elements disposed along the interior surface thereof, said male and female cam elements being provided with interlocking backdrafts, said female cam elements being angularly disposed substantially identically to the angular disposition of corresponding of said male cam elements and inclined in the same direction therewith between mean radii embracing the mean radii of the crests of the corresponding male cam elements, the mean radii of the crest and trough of each said female cam element being larger than the mean radii of the trough and crest respectively of the corresponding male cam element by at least an amount equal to the radial profile of the backdraft plus a clearance, and axially engageable complementing seal surfaces carried by said male and female portions in parallel relation of structural continuity with said cam male and female portions, said seal surfaces being adapted to limit axial engagement of the connection portions, whereby said male portion may be inserted within said female portion with said clearance and then rotated until said male and female cam elements engage each other with their backdraft surfaces in axially retentive relation, and whereby said seal surfaces will be engaged in connection sealing relation, said seal surfaces acting as a stop for maintaining said back-draft surfaces in axially binding relation.

2. In a detachable connection made of moldable yielding material, a male portion having a plurality of radially inclined male cam elements disposed about the external periphery thereof, each said male cam element being aligned in a plane substantially perpendicular to the longitudinal axis of said male portion, a female portion having corresponding radially inclined female cam elements disposed along the interior surface thereof, said male and female cam elements being provided with interlocking backdrafts in the order of one-half degree, said female cam elements being angularly disposed substantially identically to the angular disposition of corresponding of said male cam elements and inclined in the same direction therewith between mean radii embracing the mean radii of the crests of the corresponding male cam elements, the mean radii of the crest and trough of each said female cam element being larger than the mean radii of the trough and crest respectively of the corresponding male cam element by at least an amount equal to the radial profile of the backdraft plus a clearance, and axially engageable complementing seal surfaces carried by said male and female portion in parallel relation of structural continuity with said cam male and female portions, said seal surfaces comprising a tongue portion carried by one member of the connection and a corresponding groove portion carried by the other member of the connection, whereby said male portion may be inserted within said female portion and then rotated until said male and female cam elements engage each other with their backdraft surfaces in axially retentive relation, and whereby said seal surfaces will be engaged in connection sealing relation with said tongue and groove portions pressed laterally against each other by the reaction of the camming forces through the yielding material of the connection.

3. In a detachable connection of yielding material, a first member having radially inclined lugs arranged peripherally about the axis of connection, a companion member having inwardly inclined lugs disposed for cooperating relation with said lugs of said first member, said lugs of said first and companion members being back drafted, whereby said first member may be inserted within said companion member and then rotated so that said radially inclined lugs engage the corresponding inwardly inclined lugs with their corresponding backdrafts in axially retentive relation, and sealing means comprising a tongue portion carried by one of said members and a corresponding groove portion carried by the other of said members, said tongue and groove portions being disposed for tight bearing cooperation upon attachment of the connection by operation of radial forces attendant thereto.

References Cited in the file of this patent

UNITED STATES PATENTS

| Number | Name | Date |
|---|---|---|
| 535,880 | Anderson | Mar. 19, 1895 |
| 643,358 | Konold | Feb. 13, 1900 |
| 764,054 | Houdlette | July 5, 1904 |
| 1,213,760 | Dimick | Jan. 23, 1917 |
| 1,259,684 | Vinten | Mar. 19, 1918 |
| 1,474,586 | Hanrahan | Nov. 20, 1923 |
| 1,817,287 | Bell | Aug. 4, 1931 |
| 1,916,692 | Scribner | July 4, 1933 |
| 1,986,637 | L'Hollier | Jan. 1, 1935 |

FOREIGN PATENTS

| Number | Country | Date |
|---|---|---|
| 405,405 | France | Nov. 13, 1909 |
| 280,556 | Great Britain | May 17, 1928 |